United States Patent

[11] 3,578,907

[72] Inventors Hans Joachim Stock
Freiburg Im Breisgau;
Gernot Gottschall, Boblingen, Germany

[21] Appl. No. 667,397
[22] Filed Sept. 13, 1967
[45] Patented May 18, 1971

[73] Assignee Franz Morat GmbH
Stuttgart-Vaihingen, Germany

[32] Priority Sept. 13, 1966
[33] Germany
[31] M70919

[54] OPTICAL-ELECTRONIC PICTURE STORAGE APPARATUS
6 Claims, 13 Drawing Figs.

[52] U.S. Cl. .......... 178/6.8, 178/7.88, 315/10
[51] Int. Cl. .......... H04n 3/22
[50] Field of Search .......... 178/7.5 (D); 315/10; 178/7.88, 7.89, 6.8

[56] References Cited

UNITED STATES PATENTS

| | | | |
|---|---|---|---|
| 2,521,635 | 9/1950 | Kornei .......... | 178/6.8X |
| 2,678,349 | 5/1954 | Forbes .......... | 178/7.5 |
| 3,153,699 | 10/1964 | Plass .......... | 178/6.8 |
| 3,345,459 | 10/1967 | Dudley .......... | 178/7.5 |

FOREIGN PATENTS

| | | |
|---|---|---|
| 1,033,800 | 7/1958 | Germany |

*Primary Examiner*—Robert L. Griffin
*Assistant Examiner*—Richard K. Eckert, Jr.
*Attorney*—Michael S. Striker

ABSTRACT: An arrangement using optical-electronic techniques for storing a picture. A television picture tube has within it discrete photosensitive elements forming a picture to be stored. A television pickup tube is spaced from the picture tube and contains also discrete photosensitive elements. The photosensitive elements within the pickup tube correspond individually to the photosensitive elements in the picture tube. A simple amplifier amplifies the signals from the photosensitive elements so that they may be suitable processed. The image upon the picture tube is precisely reproduced upon the pickup tube by an image-forming arrangement. A grid pattern is provided on both tubes so that the two grids correspond identically in space and in time so that the image is precisely reproduced.

Inventors:
Hans Joachim Stock
Gernot Gottschall
By Michael S. Striker
Attorney

Inventors:
Hans Joachim Stocke
Gernot Gottschall
By Michael S. Striker
Attorney

Inventors:
Hans Joachim Stock
Gernot Gottschall
By Michael S. Striker
Attorney

Inventors
Hans Joachim Stock
Gernot Gottschall
By Michael S. Striker
Attorney

Inventors:
Hans Joachim Stössel
Gernot Gottschall
By
Michael S. Striker
Attorney Inventors:
Hans-Joachim Stiek
Gernot Gottschall
By Michael S. Striker
Attorney Inventors:
Hans Joachim Stock
Gernot Gottschalk
by Michael S. Striker
Attorney Inventors:
Hans Joachim Schrake
Gernot Gottschalk
By Michael S. Striker
Attorney Inventors:
Hans Joachim Sjöck
Gernot Gottschall By Michael S. Striker
Attorney Inventors:
Hans Joachim Streck
Gernot Gottschall
by Michael S. Striker
Attorney

OPTICAL-ELECTRONIC PICTURE STORAGE APPARATUS

BACKGROUND OF THE INVENTION

The storage of light may be accomplished through optical-electronic elements which convert light into an electrical current which is then used for storage purposes after suitable amplification through, for example, transistors. Optical-electronic elements may convert electrical current into continuous light flux through such elements as, for example, incandescent lamps, glow discharge lamps, electroluminescent diodes or discs, and fluorescent tubes. These elements function oppositely to the optical-electronic elements which convert light into an electrical current or wherein a light beam controls an electrical current. Examples of the latter type of elements are photocells, photoresistors, photodiodes, and phototransistors. These optical-electronic elements may be produced in the form of storage elements so that the impinging light may be converted into an electrical current for the purpose of storing the light. When applying such a circuit for converting light into an electrical current, the circuit remains operative for as long as the operating voltage prevails.

If the circuit for storing light is to be constructed of discrete elements, considerable structural complexity results when, for example, 500 picture points in both width and height are involved. Such complexity in design results from the many individual components and elements as well as the interconnections between them. This leads to poor reliability in operation and high cost for design and construction. This situation prevails even when the picture storage system is designed in the form of, for example, electroluminescent plates situated on a transparent carrier behind which a photoresistive layer is applied. An example of such a design is reported in "Internationale Elektronische Rundschau, 1966," No. 4, pages 215—218. In systems of this type an individual picture storage element may become excited by being illuminated. However, the element cannot be reset by simply preventing the light from impinging thereon. Thus, in order to reset each individual storage element, the operating voltage must be selectively disconnected. Such an arrangement therefore involves considerable complexity.

It is the object of the present invention to improve upon the art, heretofore, and to provide optical-electronic picture storage as well as picture scanning with picture corrections and electronic sampling or interrogation. The arrangement, in accordance with the present invention, has the following features: the storage of pictures at high speeds; the automatic rastering of pictures originally recorded unrastered; the excitation or activation of individual grid points by illuminating them, and resetting or nullifying the grid points by inhibiting the light from impinging upon the grid points; the electronic transfer of the picture content point-to-point upon a display carrier or means as, for example, punched tape or magnetic tape having digital designations which may be used for producing television pictures or for the transfer of freely designed fabric patterns for knitting or woven goods to be processed further to provide scanned repetition of the fabric pattern; and the automatic transfer of the repetitive pattern onto punched cards (Jacquard cards), punched tapes, magnetic tapes, or control films. Heretofore, the fabric design for repetitive scanning has to be laboriously drawn from grid point to grid point.

In accordance with the present invention, a television camera is spaced from the picture screen of a television picture repeating device (FIG. 1) and electrically connected thereto (FIG. 7), so that the picture screen is entirely covered. Furthermore, the present invention provides that the line grid of the picture tube coincides precisely with that of the pickup tube. Through precise electronic synchronization, the writing beam of the picture tube is situated at the proper instant precisely on the grid point of the picture screen. The optical representation of the picture screen on the sensitized layer of the pickup tube is scanned by the read beam of this tube. The light intensity modulation or brightness modulation of the writing beam of the picture tube is controlled by the brightness signal of the television camera. In this manner, a bright grid point on the picture tube is also controlled to appear bright on the television camera. In addition, a type of picture tube is used which has substantially long light retention through luminous phosphorous. In this way, a brightly controlled grid point, during one picture grid scanning, is still available for the next picture grid scanning for brightness control of the television camera. As a result of this arrangement, a picture which is once generated, may be retained for as long as desired. The picture is thus stored for as long as the arrangement, in accordance with the present invention, is retained in the operative state. The stored picture may be generated by, for example, using a partially transparent mirror to mirror the beam of a slide projector into the beam of the picture storage arrangement. In this manner, the fabric pattern for its slide is reproduced either directly in the television camera or upon the projection screen used as a picture screen of the television picture repeater equipment.

The scanning of the picture in the vertical direction, is accomplished through the conventional line grid used in the picture scanning of television apparatus. In the horizontal direction, however, scanning of the picture is accomplished through brightness control of the picture tube writing beam, between the grid points. This is performed with the aid of a picture grid generator similar to a striped design used for testing television apparatus applied for picture pattern generators, except with substantially finer subdivision. This implies essentially the use of higher pulse frequency for brightness control of the writing beam. The higher pulse frequency can be produced through, for example, a quartz crystal control generator. The latter can also be used to provide the line and picture synchronizing pulses by operating in conjunction with an electronic frequency divider.

With the screening of freely designed patterns, undesired and unforeseen changes may occur in the impressions of the form. These changes require that changes be made in individual grid points in order to produce a favorable appearance of the screened pattern as in knitting machines or the woven character of fabric.

For this purpose, individual grid points can be covered or become additionally activated or excited through being illuminated, in accordance with the method of the present invention.

The covering medium can, for example, be in the form of a blackened cover of the size of a grid point. This blackened cover may be in the form of a flap and secured to a thread screening frame so that when in the open or uncovered position, it is brought to the grid point which is to be covered. Once the flap is brought to the desired position, it may be closed by pulling, for example, at a cord, and thereby cover the grid point. The optical electronic feedback coupling for this point is thereby interrupted and the point is reset.

In another scheme to polarize planar surfaces which are adjacently situated, and one of the polarized lenses or discs is at least the size of a grid point while the other is larger than this, the polarized combination is brought to the grid point to be covered while in their light transmissible state. Once they are in position, the polarized lenses are rotated with respect to each other until they are positioned in the state wherein no light is transmitted.

In another arrangement, a movable glass plate is provided parallel to the picture screen. This glass plate has a bore extending from the edge to the center of the plate. The bore is filled with a fluid having the same index of refraction as the glass of the glass plate. As a result, the bore is optically ineffective. A small volume within the bore and of the size of a grid point, is filled with air. While being transported, the fluid exerts sufficiently high pressure so as to compress this small volume of air. Accordingly, this air pocket is optically ineffective while being transported to the grid point to be covered. When the pressure is released, the air bubble scatters the light to the extent that the optical-electronic feedback path is interrupted and the covered grid point is thereby extinguished or reset.

For the purpose of activating a grid point, a very transparent mirror of the size of a grid point may be brought to the location of the grid point to be activated. The light derived from a source outside of the picture area may then be mirrored into the television camera. The light transparency of the mirror makes it possible for the optical-electronic feedback to arrive at the state wherein the grid point remains activated even when the mirrored source is turned off and the mirror is moved away.

In order to make it possible to observe freely the stored picture, without disturbances, through the television camera and projector in front of the television picture repeater apparatus, a second television picture repeater apparatus may be spaced from the first one and connected electrically in parallel thereto. Furthermore, for purposes of simplifying the corrections, a slidable visual arrangement can be situated in front and parallel to the second picture screen. This visual arrangement may be positioned on the grid points to be corrected and which are mechanically coupled to the grid point covering means for mirroring means in front of the first television picture repeater apparatus. The corrections may also be applied through followup control systems which are located independently of the second picture repeater apparatus as, for example, in a console.

SUMMARY OF THE INVENTION

An apparatus for picture storage through optical-electronic means. A television picture tube has discrete photosensitive elements within it and displays a picture through a defined grid. A television picture pickup tube is spaced from the picture tube and also has discrete photosensitive elements within it. Each of the individual photosensitive elements within the television pickup tube corresponds to the individually designated photosensitive element in the picture tube. A single amplifier is used for amplifying the signals derived from the discrete photosensitive elements, in contrast to a plurality of amplifiers used for this purpose as, for example, when an amplifier is used for each photosensitive element separately, An image forming arrangement forms an image upon the television pickup tube identical to the image on the picture tube. The two images correspond identically so that the two grids of the tubes are identical in both space and time.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIGS. 5, 5*a* and 5*b* is a functional diagram of the arrangement for applying grid corrections;

DESCRIPTION OF THE PREFERRED EMBODIMENTS

Figure 1:
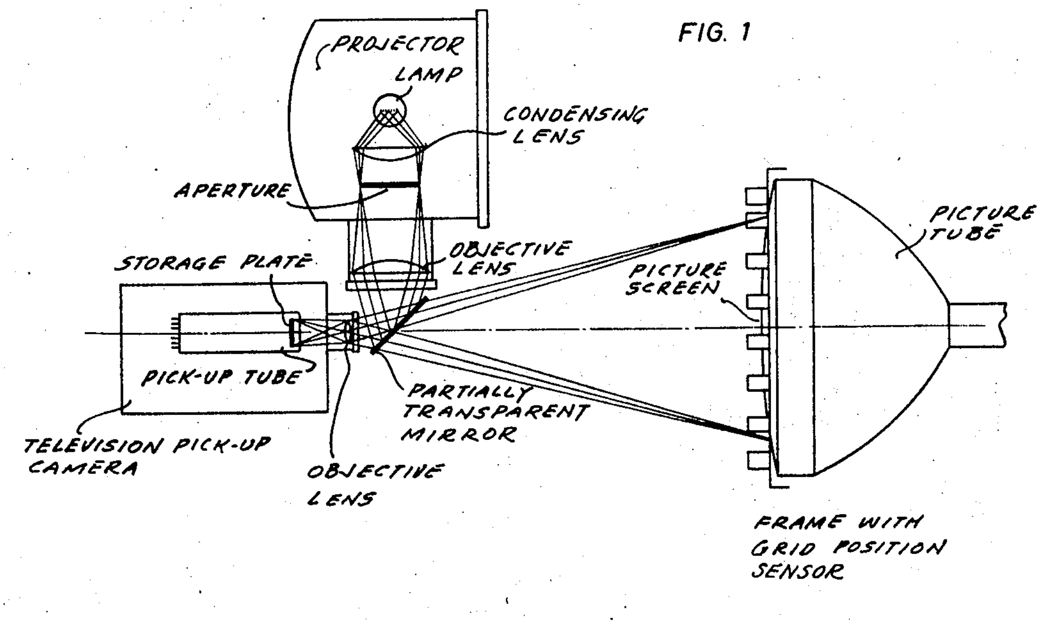
FIG. 1 is a functional schematic arrangement of a television camera, picture tube and projector in accordance with the present invention.

With reference to FIG. 1, the electronic transfer of the contents of a picture onto a display carrier which can then control the fabric producing arrangement of a textile production machine, is described as used in conjunction with a Moratronik circular knitting machine, not shown. This is for the purpose of illustrating the application of the invention, and reference may also be had for this purpose, to the U.S. application Ser. No. 532,304 now U.S. Pat. No. 3,449,928.

A ring counter A (FIG. 7) counts the moving steps of a film illuminating apparatus *ab* from the beginning of the scanning of a stored pattern. The repetitive width may, for example, be 420 stitches = 420 grid points, and the repetitive height may be, 456 stitch rows = 456 grid lines. This corresponds to 420×456=stitch-grid points. The number or count held by its counterstage is the number of grid points of the pattern in the line direction (width) as, for example, 420. Assume, for example, that during scanning, the film step or film increment No. 154 is attained. The film transport steps are essentially slower than the scanning of the entire stored pattern (picture frequencies). Thus, there may, for example, be 10 film transport steps per second, whereas the picture frequency is 25 Hz. Accordingly, the entire stored pattern may be scanned 2 and ½ times by the writing beam, while the film transport moves one step.

The ring counter B has its counting stages also set to the number of grid points of the pattern in the line direction (for example, 420). This ring counter B receives its impulses from the picture grid generator, and counts these from the beginning of the scanning of the first line with the grid points covered by the writing beam of the picture tube.

The counting stages of the counters A and B are interconnected by a resistor and diode network. The arrangement is such that whenever the counting results are equal as, for example, the attained number 154, a null signal appears at the output of an accumulator line K. The null signal is converted by the NOT circuit (inhibitor or phase inverter) into a coincidence pulse applied to a ring counter C. This counter C is set to the number of the system counter of the knitting machine, which is equal to the number of tracks of the control film and also equal to the number of colors of the pattern. Thus, with 24 knitting systems and a two-color pattern (black and white combination) are involved, twelve counting stages are associated with one stitch row group. With the aforementioned coincidence pulse the ring counter C is set to the counting stage I, corresponding to the first lines scanned by the writing beam. From this counting stage I one of three inputs of the AND gates 1 and 2 are actuated. These AND gates are associated with tracks 1 and 2 of the illuminated control film. The light intensity signal from the grid scanning television camera, is applied to the second input of the AND gate 1. The second input of the AND gate 2 receives the light intensity signal reversed in phase by the NOT circuit H. The "dark" signal for track 1 implies a "bright" signal for track 2.

The light intensity signals are, however, transmitted to the pulse shapers 1 and 2 for determining the illuminating time of the film, only when a third input appears at the AND gates 1 and 2 as a coincidence signal. This coincidence signal is generated when the counting results of the ring counters D and F are equal and are applied by way of the NOT circuit J. The counter D counts the line groups scanned by the writing beam of the picture tube. The counter F counts the stitch row groups corresponding to a film section, as described in greater detail below. In the example being described, both counters are set on the first count corresponding to the first stitch row group. When the writing beam scans the line 2, the film step as, for example, 154, has not changed as yet. Thus, when the counters A and B have the same count, the grid point has been attained precisely below the first line number 574=420+154. As a result, the ring counter C receives the second coincidence pulse from the line K and NOT circuit G. This second coincidence pulse transfers the counter to the stage II, corresponding to the second line scanned by the writing beam.

From this counting stage II one of three inputs of the AND gates 3 and 4 are activated. These AND gates 3 and 4 are associated with the tracks 3 and 4 of the illuminated control film. The second input of the AND gate 3 receives the light intensity signal from the television camera scanning the grid. The second input of the AND gate 4 receives the light intensity signal reversed in phase by the NOT circuit H. (A "dark" signal for track 3 implies a "bright" signal for track 4). These light intensity signals are, however, further transmitted to the pulse shapers 3 and 4 for determining the illuminating time of the film, when also a pulse is simultaneously applied to the third input of the gates 3 and 4. This third pulse, or pulse at the third input of gates 3 and 4, occurs when the ring counters D and F have the same count and apply the coincidence signal by way of the NOT circuit J. Both counters D and F are still set to the first count corresponding to the first stitch row group.

This process continues until line 12, which illuminates the tracks 23 and 24 of the film, by way of the counting stage XII. This, however, still occurs at the same film step as, for example, number 154.

When coincidence prevails between the counting stage XII of the counter C with the following line synchronizing pulse, the AND gate M emits a pulse which transfers the ring counter D from its first count to the second count or counting stage. The counter D, therefore, counts the cycles of the counter C and thereby the line groups-stitch row groups scanned by the writing beam of the picture tube. In the aforementioned example, 24 knitting systems divided by two colors = 12 stitch rows = 12 lines of one-line groups for the entire scanned repetitive pattern. If the latter has, for example, 456 stitch rows, then 456/12=38 stitch row groups = 38 line groups. The counter D is set to the count dependent upon the height of the repetitive pattern, so that the counter D returns to its first stage or state after 38 line cycles of the counter C. This is the case when the writing beam of the picture tube begins to scan a new picture at the beginning of the first line, after the elapse of one twenty-fifth seconds.

If the pattern is to be knitted on a circular knitting machine having, for example, 1680 needles on its needle cylinder, then, in the foregoing example, the pattern must be repeated 4 times with respect to the 420 stitch width. Correspondingly, a further ring counter E counts the cycles of the counter A set to the repetitive width 420. In the present example, the ring counter E is set to the count 4. When transferring from 4 to 1, 1680 film steps occur, corresponding to 1 revolution of the needle cylinder in the circular knitting machine. At the same time, one ring counter F is transferred by one step to the second count which represents the film section between film step 1681 and 3360. On this film section, the second stitch row group = 2. Line group from lines 13 to 24 of the repetitive pattern must be recorded 4 times. The capacity of the counter F is set to the count of the stitch row groups of the applicable repetitive pattern as, for example, 38. Only when counters D and F coincide, the AND gates 1 to 24 transmit. At all other times, they are cut off. Thus, at the film steps 1 to 1680, corresponding to the first revolution of the needle cylinder, the first line or stitch row group is released and the AND gates 1 to 24 provide an output for the film illuminating signals. In the aforementioned example, this corresponds to lines 1 to 12 in the first line or stitch row group. In the second line group, lines 13—24 are involved. The preceding condition occurs when the counter D coincides with F with respect to the second count, or the second line group for which the second needle cylinder rotation of the knitting machine is provided (film step 1681 to 3360).

Accordingly, for every complete picture scanned by the writing beam, the light intensity signals of all grid points are applied very quickly one after another in sequence to the second inputs of the AND gates 1—24. These are, however, transmitted only from the outputs of these AND gates to the pulse shapers 1—24 of the film illuminating apparatus, only when simultaneously the corresponding vertical grid space as, for example, grid space 154, is scanned, by the writing beam during its line motion. At the same time, the writing beam must be situated at the appropriate line as, for example, line number 15 and the associated line group as, for example, number 2, (lines 13—24). This corresponds to the AND gate 3. The preceding line group corresponds to the illuminated film section provided with the pattern section (stitch row group, for example, at the film step number 1680+154 = number 1834). This is in the 38 stitch row group, for example, at the end of the film to be illuminated. The line group at the fourth repetition, for example by the film step number (37.1680+3.420+154), is number 63574. The number of film steps to be illuminated to the end of the film are, therefore, only still, at film step number (1680.38) = number 64840 or 63840—63574c'x420—154=266.

Regardless of which portion of the stored pattern the grid point to be transferred to the film is situated, the film illumination controlled by the pulse shapers 1—24 begins no later than one twenty-fifth second after the film transport step has been completed. The film illumination is controlled by the pulse shapers 1—24 by way of the magnetic shutters 1—24.

In this description, the functional aspects are explained with ring counters of large capacities. With the electronic counter technology, there are a number of possibilities to arrive at the same solutions with considerably simpler equipment. For example, one possibility is to connect in sequence a plurality of decade ring counters which may be set to a desired count, corresponding to the repetitive pattern through the use of a plug board. It is also possible to use electronic precounters arranged in a decade or binary manner. With the simplified arrangement, the resulting conversion of the functions are related to the block diagram, in principle, which presents a simplified view.

Figure 2:
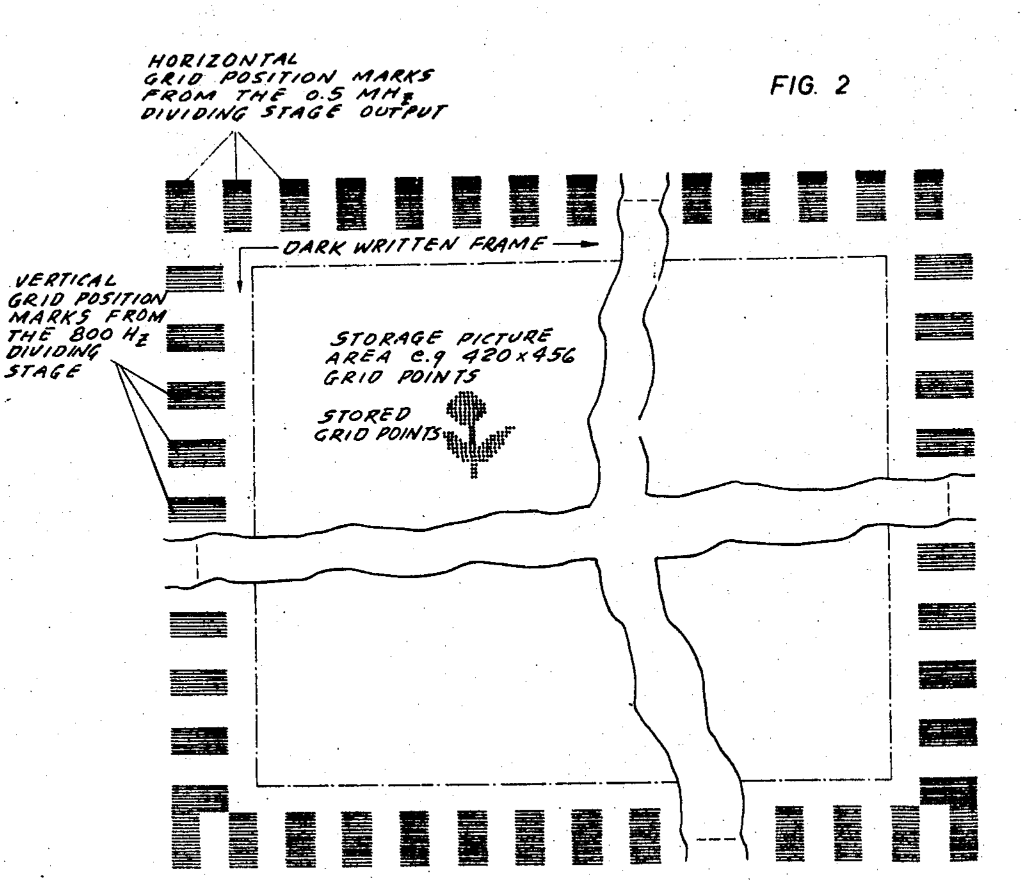
FIG. 2 is a functional diagram of the screen of the picture repeater apparatus (picture tube) with the picture storage area and grid position marks.
Figure 2A:
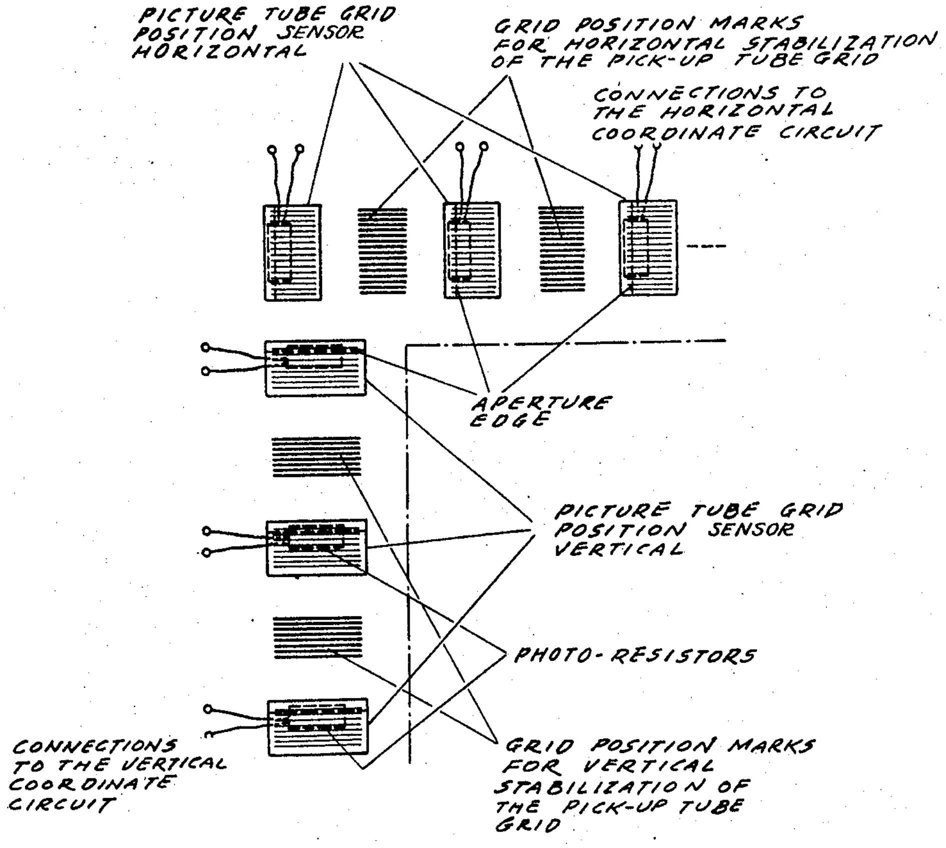
FIG. 2*a* is a sectional view of the upper left corner of the screen of FIG. 2, and shows the picture repeater apparatus with grid position scanning.
Figure 3:
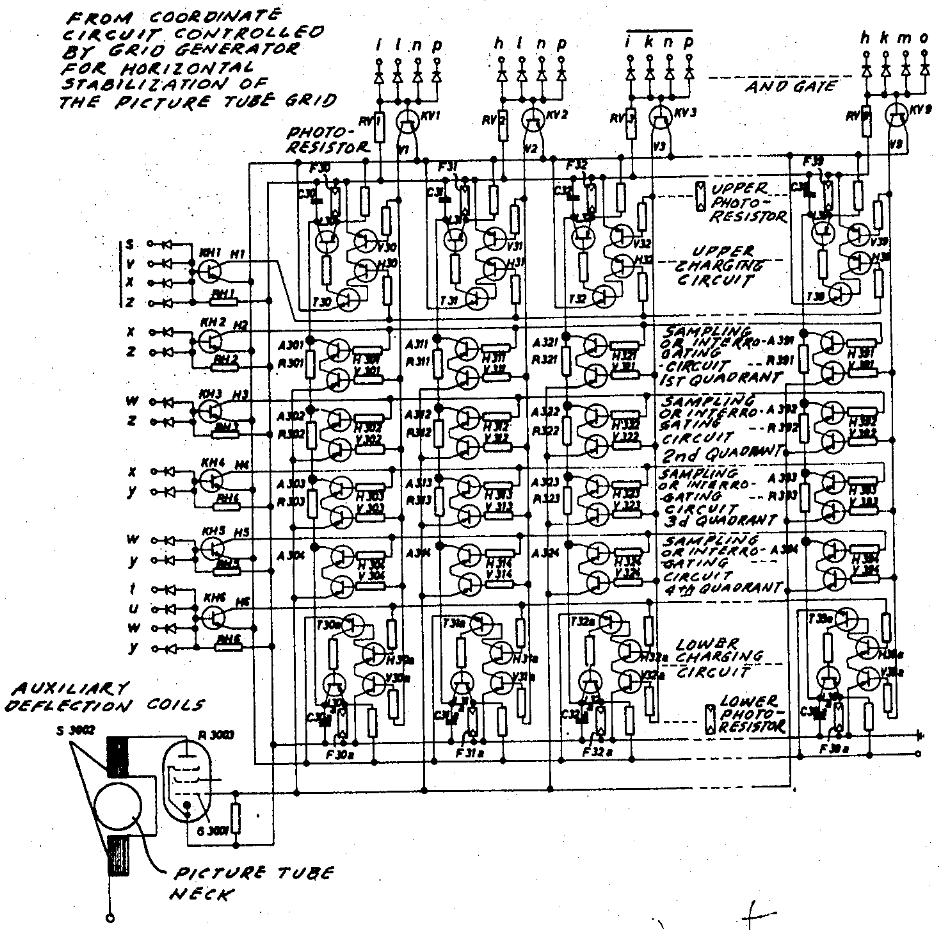
FIG. 3 and 3*a* is an electrical schematic diagram and shows the arrangement for stabilizing the grid in the horizontal direction of the picture tube grid.
Figure 3A:
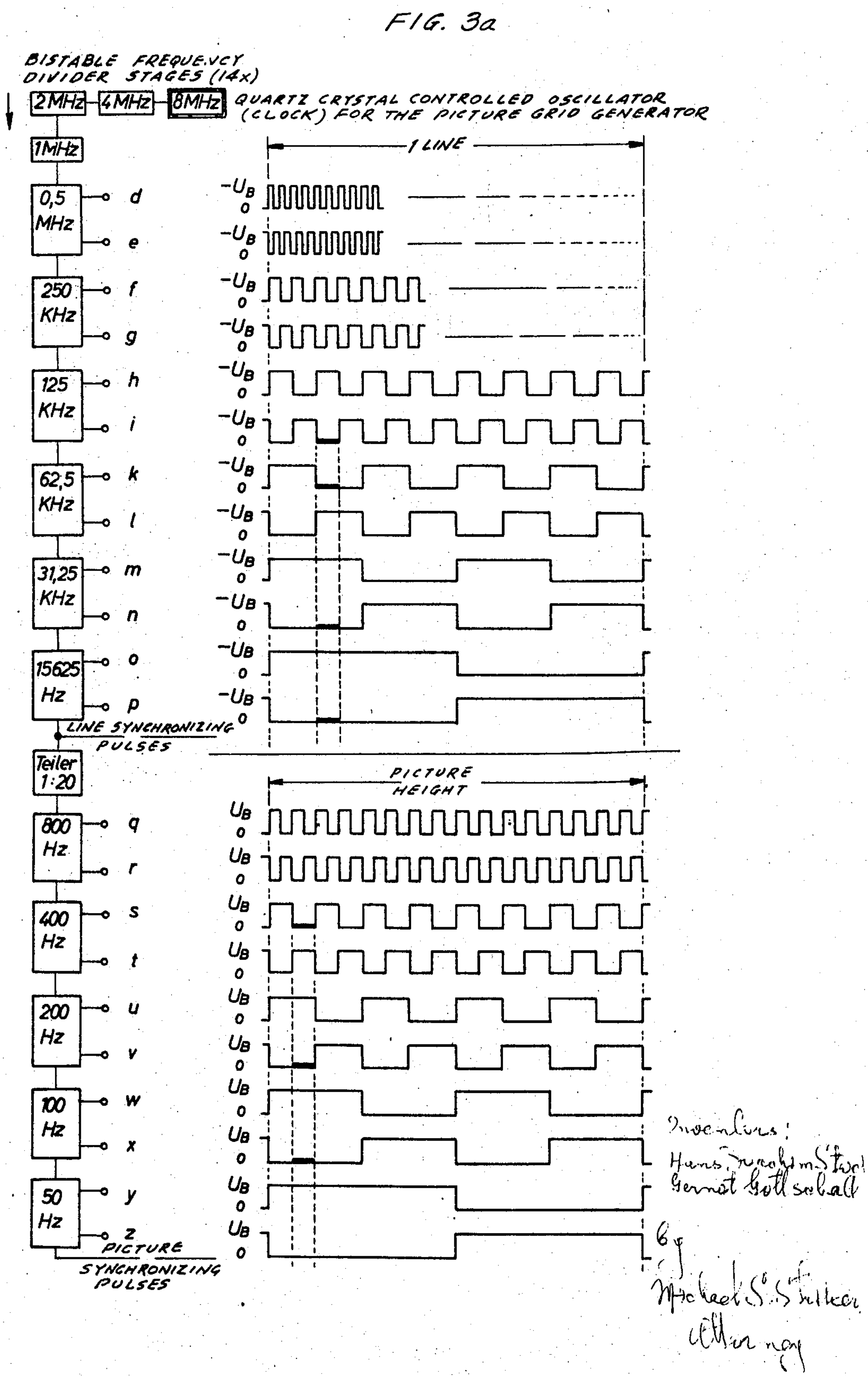
Figure 5:
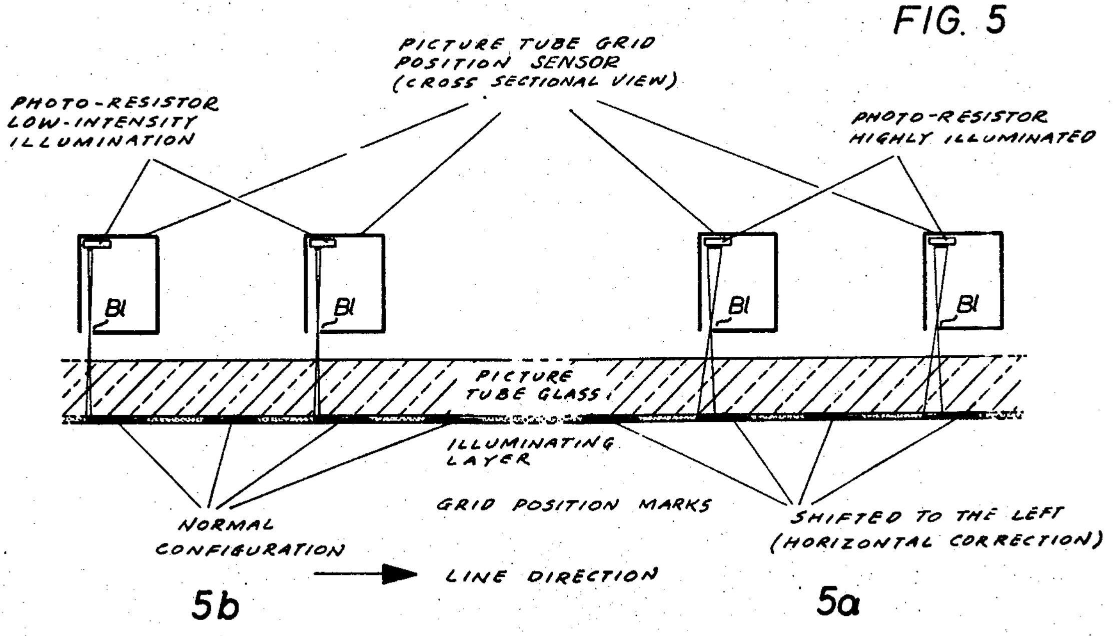

Since the lines and picture deflection as well as the television receiver and television camera are synchronized by the same apparatus—grid generator—the grid points are all properly situated at the beginning of the individual deflection processes. Thus, the grid points are all equally situated. As the deflection processes progress, this identity or correspondence is dependent not only upon the final magnitudes of the deflection voltages or currents, but also upon the timing ("picture linearity" and "line linearity"). Even with good compensations of the picture and line linearity with the usual equipment, deviations of 1 to 2 percent may arise. Such deviations between the grid of the picture tube and that of the pickup tube hinder the optical-electronic feedback coupling and hence the function of the picture storage. It is not possible to apply a correcting control in the form of regulating the state of the grid points by affecting the deflection voltages through a deviation of the given grid, within the stored picture. This is because the grid points are, in accordance with the pattern, bright and dark controlled and are, therefore, regularly available for grid correction. Furthermore, because of their disturbing effect, control lines or the like, are not desirable. As a result, grid position marks are inscribed, in accordance with the present invention, onto the picture screen of the picture tube and around the stored picture edge. This may be seen by referring to FIG. 2. These grid position marks are produced in the commonly known manner by the television picture pattern generators of the picture grid generator. The positions of these grid position marks are established and measured at the edge of the picture screen through firmly mounted photoelectric grid position sensors (FIG. 1, 2*a* and 5). The output voltage of these photoelectric grid position scanners is used as a regulating voltage for correcting the horizontal and vertical deflection in a sectional manner (FIG. 3). The position of the grid is, as a result, secured to the edge of the picture tube, and the line and picture deflection are linearized including the elimination of any rectilinear errors.

At the same time, the corrections, to be described below, are controlled from all the edges.

During the picture scanning the control voltages are stored. In this manner, they are also available for controlling purposes, when the writing beam is no longer at the edge zones with the grid position marks, but is instead on the picture storage area.

Apart from this control system, a second control system operates simultaneously to correct the position of the grid on the pickup tube. The light intensity signal of the pickup tube corrects and stabilizes the control voltages for correcting the pickup tube grid in accordance with the picture tube grid. The picture tube grid furthermore is in accordance with the grid position sensor at the edge of the picture tube screen. In what follows, the operation of the horizontal grid correction of the picture tube grid is described in relation to FIGS. 3 and 5.

The location of the grid position marks at the upper and lower edge is determined so that, when no control prevails, the grid position marks extend far over the aperture edge of the picture tube grid position sensor. The grid position marks extend, in this manner, to the left, and thereby intensely illuminate the photoresistors (FIG. 5*a*). When the control circuitry is activated, this produces only a small negative voltage at the photosensitive resistor and thus at the grid of the tube in FIG. 3. This voltage controls the deflection current through the additional deflection coils of the picture tube. As a result, a large deflection current is established to deflect the writing beam to the right. The grid position mark is also thereby shifted to the right until it disappears at a very narrow edge (essentially narrower than the width of a grid point) behind the aperture edge (FIG. 5). This provides a small amount of illumination on the photoresistor and a high negative voltage thereat and at the tube. Through the additional deflection coils, a deflection current is also provided sufficient to maintain this particular state.

Since the values of the control voltage between the upper and lower picture tube grid position sensor, may be different, as for example in trapeze errors, the picture tube grid position sensor is made of a voltage divider comprising resistors R321, R322, R323 as shown in FIG. 3. This is so that the deflection correction may properly result also in the second and third quadrant of the screen height. In this manner, the writing beam does not only cover, through its horizontal motion, the region of the position scanning pair, but also through its vertical motion in a step-wide manner, the screen quadrant of the vertical control voltage.

A coordinate circuit (FIG. 3) having regulating voltages controlled from the picture grid generator, includes the photoresistors F32 and F32*a*. The regulating voltage associated with these photoresistors, is applied through the charging circuit to the corresponding capacitor C32, or C32*a*. The latter is charged through this regulating voltage when the writing beam is in the vertical zone of the associated grid position mark and in the region of the grid sensor associated with the particular capacitor. The voltage associated with the photoresistors as, for example, F32 and F32*a*, is also applied to the grid G3001 in tube R3003 for transmitting the deflection current to the deflection coils, for correcting purposes, S3002. The grid of this tube R3003, is also connected to the voltage dividing circuit, for example, R321, R322, R323.

The capacitors C30, C30*a* to C39, and C39*a* serve to store the control voltage for the time interval for complete picture scanning and until the cycle is repeated. This is because the regulating or control voltage is required precisely then, when the writing beam is no longer at the grid position marks, but is instead somewhere else on the picture storage area.

The charging circuit transistors as, for example, L32 and T32, which are activated by two transistors connected to them as, for example, H32 and V32, are arranged such that one of them is connected to the vertical coordinate line as, for example, V3. The other one of the transistors is connected to the grid sensing row associated with the horizontal coordinate line as, for example, H1. The connection is made by way of a base resistor, Only when both transistors H32 and V32 are both conducting, the charging circuit transistor L32 connects the photoresistor F32 with the capacitor C32. This is only the case when both of the coordinate lines H1 and H3 connected to the charging circuit L32, are brought into the circuit by their coordinate transistors KH1 or KV3, respectively.

When the writing beam is, for example, in the region of the third grid position mark of the upper row, the situation is as follows:

At this instant of time, the frequency dividing stages *i* and *k*, and *n* and *p*, all have no voltage. As a result, the base resistor RV3 (AND gate) of the coordinate circuit transistor KV3, can cause the latter to be in the circuit so that it is connected to the coordinate line V3 with the negative operating voltage.

At the same time, the frequency dividing stage connections *s*, *v*, *x* and *z* also have no voltage applied to them. The coordinate circuit transistor KH1 thus causes the coordinate line H1 to be connected to the negative operating voltage, through the state of the base resistor RH1. As a result, the two transistors V32 and H32 are turned on and actuate the charging circuitry transistor L32, by way of the transistor T32. The charging circuit transistor L32 connects the terminal of the photosensitive voltage dividing circuit at F32 with the capacitor C32. The capacitor C32 is applied directly across the photoresistor for recharging.

The remaining transistors connected to the coordinate line V3 or H1, in sequence, are connected to a second coordinate line which is not turned on. The arrangement is such that at an intersection only, where both coordinate lines are turned on, can a circuit function take place. The frequency dividing connections at the AND gate for example, *i–k–n–p* or *s–v–x–z*, are selected so that the writing beam, during a scanning movement, is located directly in the coordinate area designated by the frequency divider.

Figure 4:
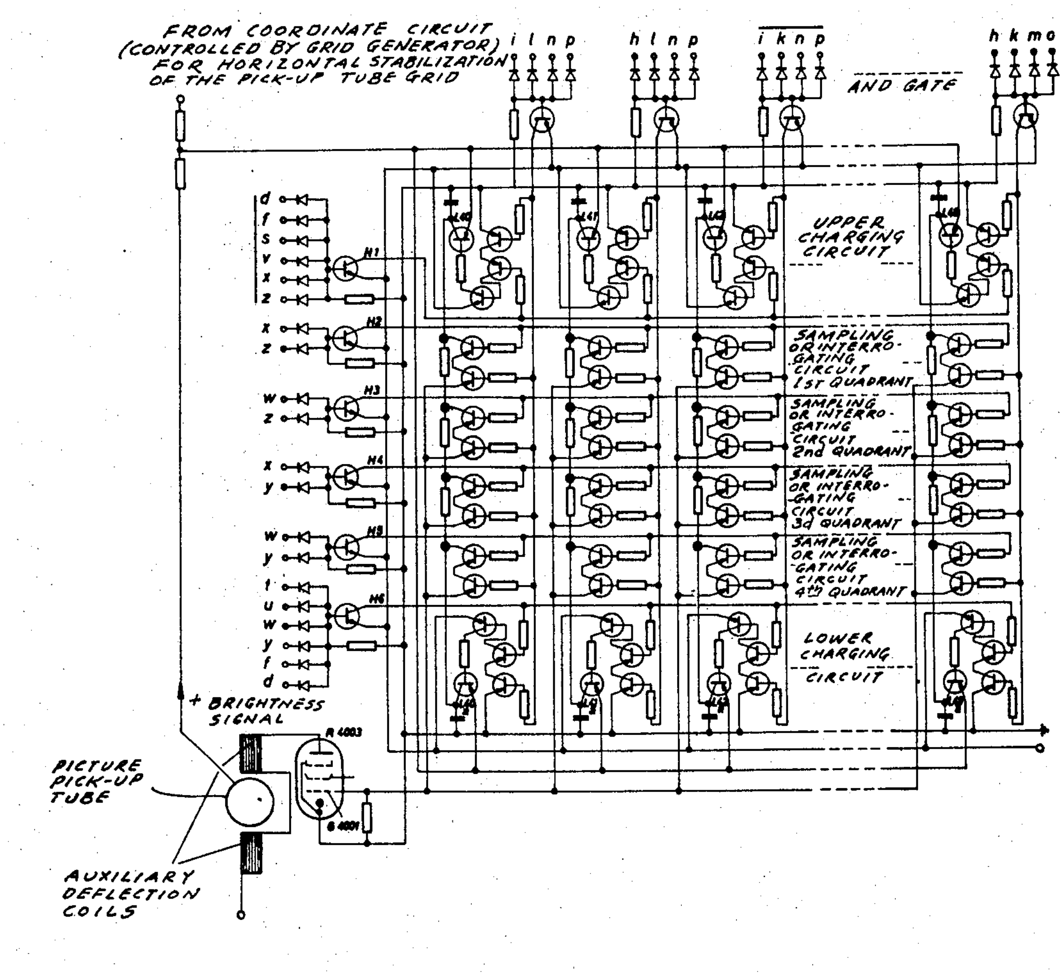
FIGS. 4 and 4*a* is an electrical schematic diagram of the arrangement for stabilizing the grid in the horizontal direction of the pickup tube grid.
Figure 4A:
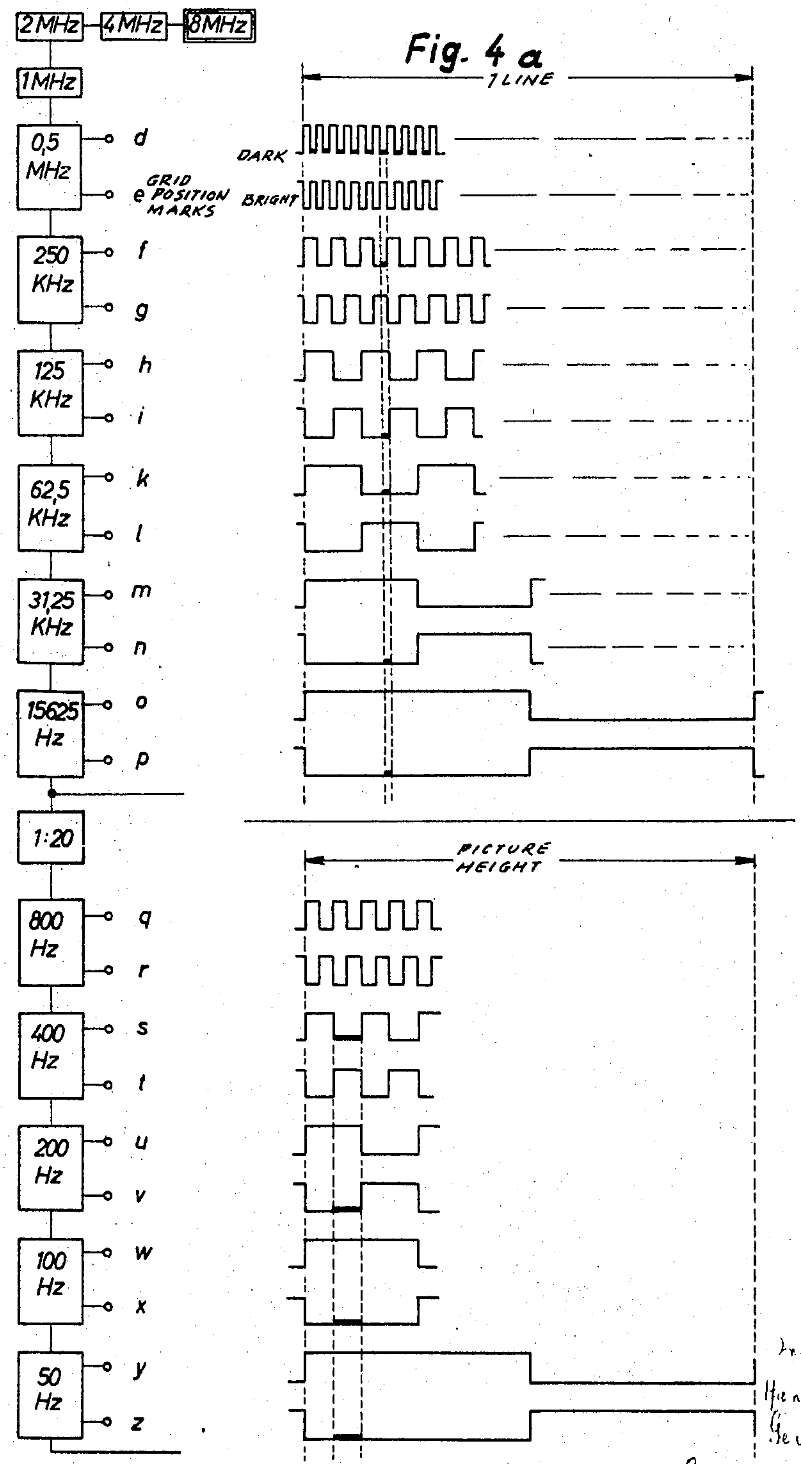
Figure 6:
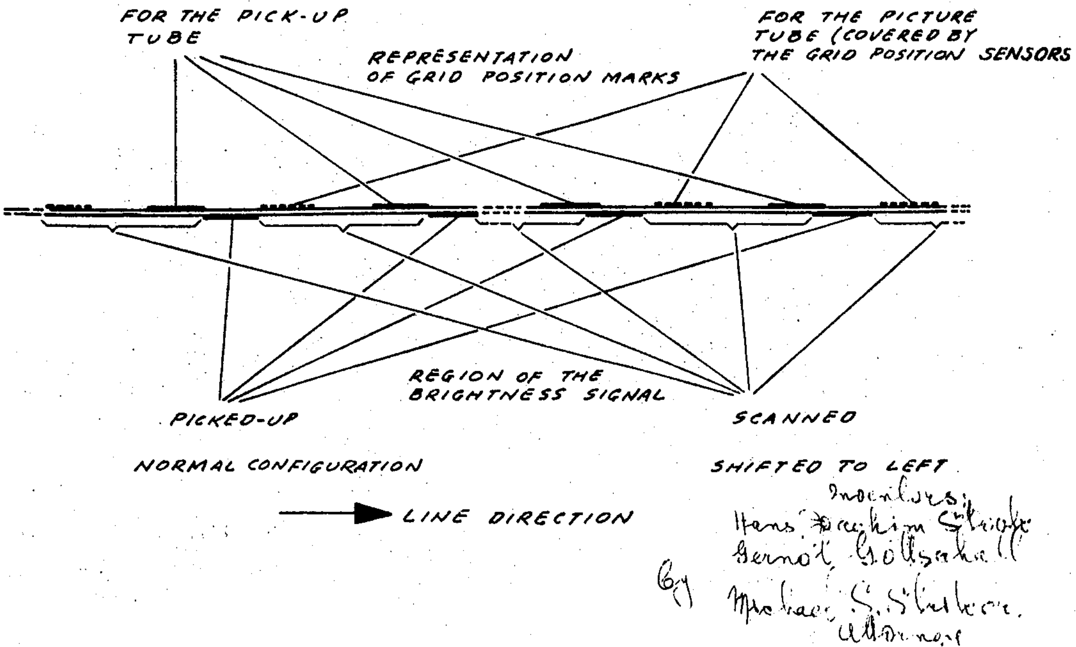
FIG. 6 is a further geometrical diagram for indicating the procedure for applying grid corrections.

The interrogating circuits consist only of the transistors, for example, H322 and V322, connected in series. When both of these transistors are turned on, the tap A322 of the voltage dividing circuit associated therewith, is connected to the grid G3001 of the tube controlling the auxiliary deflection coils, when the writing beam is directly within the coordinate area 322 of the associated screen region. The grid correction for the pickup tube grid, as shown in FIG. 4 and FIG. 6, operates similarly. Instead of individual photoresistors F30, F30*a* to F39, and F39*a*, however, the regulating voltage is derived from the brightness or light intensity signal of the pickup tube. This signal is lead to all charging circuits L40, L40*a* to L49, and L49*a*.

Instead of covering the grid position marks with an aperture edge, the brightness signal from the pickup tube is here sampled or taken from the 250 kHz. and 0.5 MHz. dividing stage, by way of outputs *v* and *f*. These outputs are, for this purpose, connected to the AND gate of the horizontal coordinate lines H1 and H6 in FIG. 4. As a result, the brightness signal output of the pickup camera is applied to the corresponding capacitor by way of the charging circuit, when the writing beam has concluded the writing or inscription of the raster position marks. Assume a shifting to the left of the grid of the pickup tube and that a portion of the grid position mark is still grasped by the scanning beam (FIG. 6). Assume further that the light intensity signal output or brightness signal output of the pickup camera is already connected to the associated capacitor, via the charging circuit (FIG. 4). Then the capacitor becomes charged and supplies the regulating voltage to the interrogating circuit or sampling circuit, which is simultaneously turned on. The sampling circuit transmits further the regulating voltage to the grid G4001 of the tube R4003. This tube controls the current through the auxiliary deflection coils S4002 so that the pickup tube grid is shifted to the right. As a result, the portion of the grid position mark that was grasped, is made small, and an equalizing condition is established with a very small grasped portion of the grid position mark (substantially smaller than a grid point). In this manner, the grid of the pickup tube is set to the small deviation of the grid of the picture tube. During the scanning of the picture area, the regulating voltage for the corresponding picture region is taken from the voltage divider taps, via the coordinate-control interrogating or sampling circuit, as described above for the picture tube grid correction.

The grid correction and the vertical direction functions analogously in picture tubes and pickup tubes, as described above in relation to grid corrections in the horizontal direction. The grid position sensors are thereby used at the left and right vertical picture tube edge. The grid position sensors are also connected to the left and right external vertical coordinate lines corresponding to the charging circuit in the coordinate system circuit. They are also connected to the regulating voltage divider, in the horizontal direction, between the regulating voltage storage capacitors.

Figure 7:
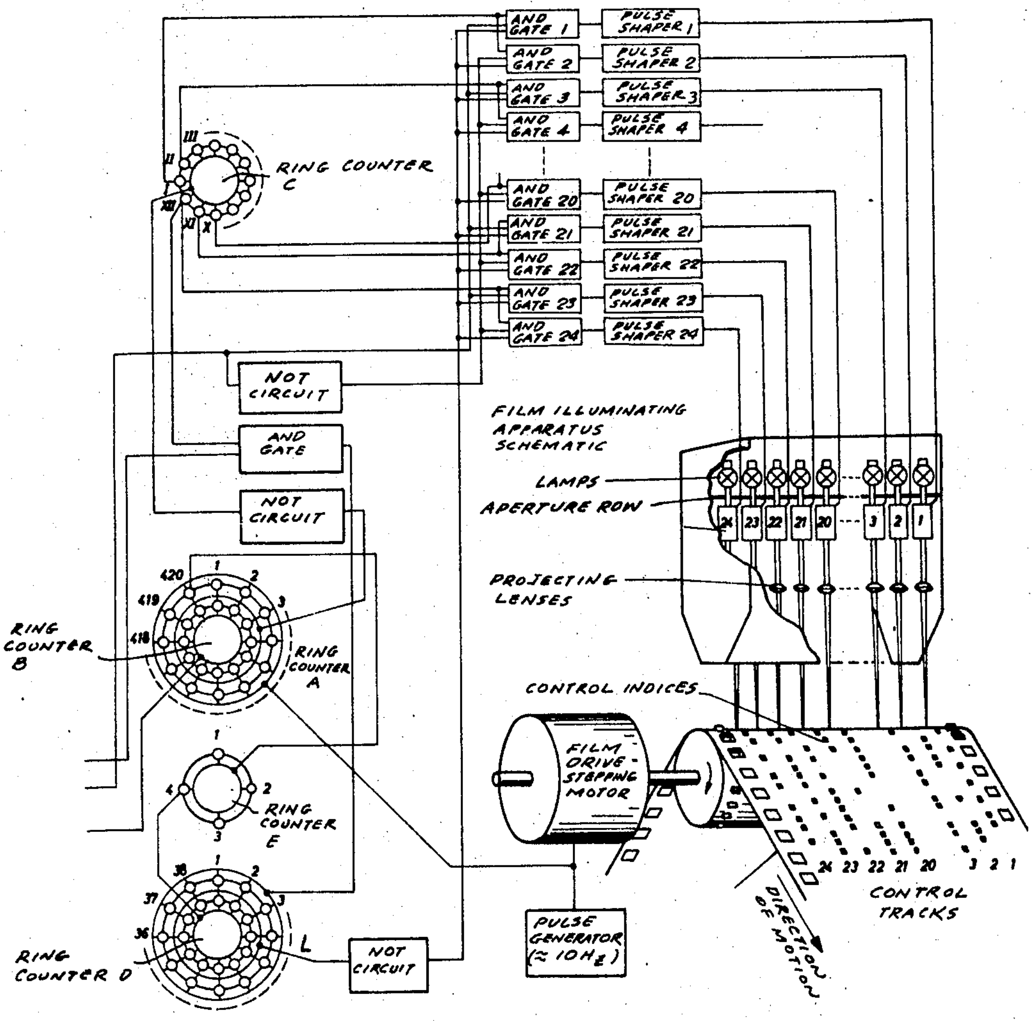
FIGS. 7 and 7*a* is a functional schematic diagram of the optical-electronic picture storage arrangement, in accordance with the present invention, with grid and electronic sampling and interrogation.
Figure 7A:
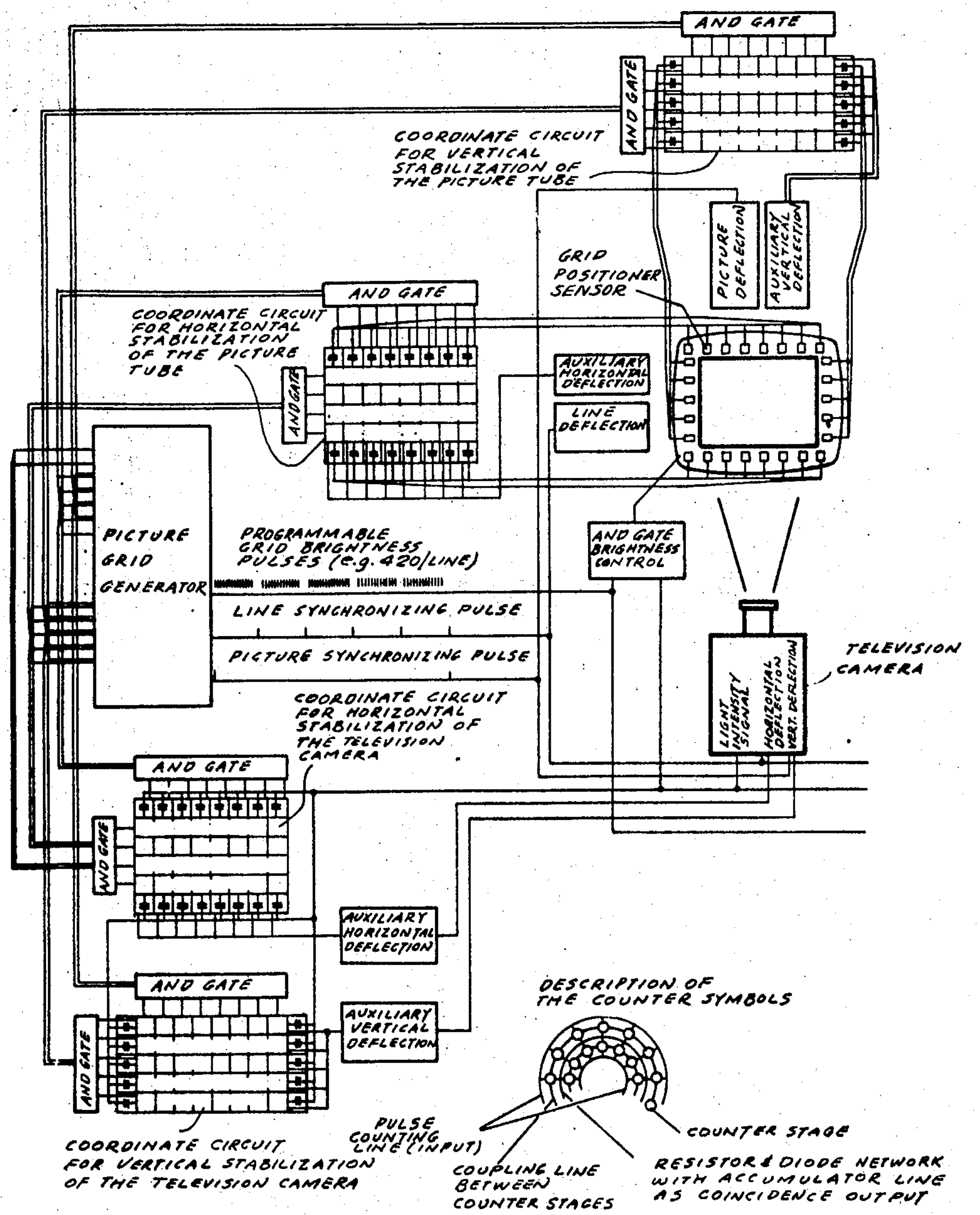

In the preceding description of the block circuit of FIG. 7 for transferring the picture content to the control film of the Moratronik circular knitting machine the control markings on the film are illuminated in a row or line angularly disposed to the film. The control markings on the film are associated with a perpendicular stitch row within a stiching group. With a view to simplifying the description, it has not been explained that every vertical or perpendicular stitch row control mark on the film must be separated from adjacent marks on the film in a stepwise manner from control track to control track, in the longitudinal film direction. This separation corresponds to the separating space prevailing about the needle cylinder of the circular knitting machine. Through this displacement of the control tracks, the control tracks of the film in the read direction of the knitting machine may be scanned simultaneously by photodiodes in an angular manner simultaneously by photodiodes in an angular manner in relation to the film.

The track displacement on the control film can be accomplished in two ways:

1. The illuminating system 1 to 24 (comprising, for example, a lamp aperture, magnetic shutter, projecting lenses) is not situated in a row transverse to the film as shown in FIG. 7, but is instead displaced in a stepwise manner in accordance with the corresponding system separation or space.
2. The illuminating signals derived from pulse shapers 1 to 24, can be delayed through the shift register 2 to 24, before they actuate the magnetic shutters 1 to 24 of the film illuminating apparatus. The illuminating systems of the individual tracks are thereby arranged transverse to the film, as shown in FIG. 7, and the shift register has an increasing number of shifting stages corresponding to the track-to-track system separation. The track 1 can thereby become directly illuminated without delay. Assuming for illustrative purposes, a system separation of 70 needles on the machine, the shift register has 70 shift stages for track 2. The shift register of track 3 has 140 shifting stages, whereas that for track 4 has 210 stages, etc. This same principle is extended to the shift register for track 24, which has 1610 shift stages.

The invention has the following possible applications: One is to electronically excite a stored picture, by way of a second amplifier, as, for example, through the input of a television picture out of a second television pickup camera or from television broadcasting. Another application resides in the electronic excitation or blanking an individual stored picture point by way of a second amplified input resulting from the input of a pulse as, for example, from an electronic counter which counts the grid pulses from the picture grid pulse generator. Such counting would be during the period beginning from a picture scanning to the instant that the desired picture point has been attained through the electron display beam of the picture tube.

It will be understood that each of the elements described above, or two or more together, may also find a useful application in other types of optical electronic picture storage systems differing from the types described above.

While the invention has been illustrated and described as embodied in optical-electronic picture storage systems, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

We claim:

1. An optoelectronic picture storage arrangement comprising, in combination, a television picture receiving tube with picture screen and electron beam for applying an image to said picture screen of said receiving tube by said electron beam; a television picture camera tube with pickup screen; an electron beam in said camera tube scanning said pickup screen for converting light signals impinging upon said pickup screen into corresponding electrical signals; projection means for projecting images appearing on the screen of said receiving tube onto the pickup screen on said camera tube; feedback means interconnecting said receiving tube and said camera tube for feeding back to said receiving tube signals from said camera tube so that the image on the screen of said receiving tube is continuously displayed for storing said image; synchronizing means connected to said camera tube and said receiving tube and applying synchronous deflection voltages to said electron beam means of said receiving tube and said camera tube; blanking means connected to said receiving tube for blanking periodically the electron beam of said receiving tube during each horizontal deflection so as to produce during each horizontal deflection a series of; information storage means for storing the information content of said image on said receiving tube; and transmission means for transmitting point by point the image on the screen of said receiving tube onto said information storage means.

2. The arrangement as defined in claim 1 including writing means connected to said receiving tube means for writing raster position markings at the borders of the screen of said receiving tube during each image period, said borders being free of said image on said receiving tube screen; and regulating means connected to the deflection systems of said electron beam means of said camera tube and said receiving tube for scanning said raster position marking on said receiving tube and superimposing regulating voltages upon the deflection voltages of said deflection systems so that the point-to-point rasters of said receiving tube and said camera tube coincide by an amount less than the magnitude of a raster increment.

3. An optoelectronic picture storage arrangement comprising, in combination, a television picture receiving tube with picture screen and electron beam for applying to said screen of said receiving tube a picture through said electron beam; a television picture camera tube with pickup screen and electron beam scanning said pickup screen for converting light signals impinging upon said pickup screen of said camera tube; feedback means interconnecting said receiving tube and said camera tube for feeding back signals to said receiving tube from said camera tube so that the screen of said receiving tube displays a substantially continuous image and thereby stores said image on the screen of said receiving tube; synchronizing means connected to said camera pickup tube and said receiving tube for applying to said electron beam means synchronized deflection voltage; writing means connected to said receiving tube for writing raster position marking at the borders of the screen of said receiving tube during each image period, said borders being free from said image; and regulating means connected to the deflection systems of said electron beam means of said camera tube and said receiving tube for sensing said raster position markings and superimposing regulating voltages upon the deflection voltages of said deflection system so that the line rasters of said receiving tube and said camera tube coincide.

4. The arrangement as defined in claim 3 including blanking means connected to said receiving tube for periodically blanking the electron beam of said receiving tube during each horizontal deflection so as to produce during each horizontal deflection a series of signal voltages corresponding to a series of points at which the image is sensed.

5. The arrangement as defined in claim 3 wherein said projection means includes semitransparent mirror means positioned between said receiving tube and said camera tube to reflect the picture to be stored onto said camera tube.

6. The arrangement as defined in claim 4 including information storage means for storing the information content of said image on said receiving tube screen; and transmission means for transmitting to said information storage means point-to-point the image appearing on the raster of said receiving tube means.

PO-1050
(5/69)

UNITED STATES PATENT OFFICE
CERTIFICATE OF CORRECTION

Patent No. 3,578,907 Dated May 18, 1971

Inventor(s) Hans Joachim Stock and Gernot Gottschall

It is certified that error appears in the above-identified patent and that said Letters Patent are hereby corrected as shown below:

Column 10, line 38, after "of" insert --picture points-- line 62, after "screen" insert:

--into corresponding electrical signals; projection means for projecting images appearing on the screen of said receiving tube onto said pick-up screen--

Signed and sealed this 30th day of November 1971.

(SEAL)
Attest:

EDWARD M.FLETCHER,JR.
Attesting Officer

ROBERT GOTTSCHALK
Acting Commissioner of Patents